(12) United States Patent
Trinkaus

(10) Patent No.: US 8,604,970 B1
(45) Date of Patent: Dec. 10, 2013

(54) SYSTEMS AND METHODS FOR GENERATING DATA IN A DIGITAL RADIO ALTIMETER AND DETECTING TRANSIENT RADIO ALTITUDE INFORMATION

(75) Inventor: Trevor R. Trinkaus, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 393 days.

(21) Appl. No.: 12/794,214

(22) Filed: Jun. 4, 2010

(51) Int. Cl.
*G01S 13/08* (2006.01)

(52) U.S. Cl.
USPC .......................................... 342/120; 342/192

(58) Field of Classification Search
USPC ................................................ 342/120–122
See application file for complete search history.

(56) References Cited

U.S. PATENT DOCUMENTS

| | | | | |
|---|---|---|---|---|
| 3,140,483 A | * | 7/1964 | Sikora et al. | 342/65 |
| 3,403,398 A | * | 9/1968 | Engholm et al. | 342/89 |
| 4,698,636 A | * | 10/1987 | Marlow et al. | 342/104 |
| 5,046,010 A | * | 9/1991 | Tomasi | 701/4 |
| 5,072,223 A | * | 12/1991 | Hethuin et al. | 342/122 |
| 6,255,982 B1 | * | 7/2001 | Hethuin | 342/122 |
| 6,347,286 B1 | * | 2/2002 | Petillon | 702/77 |
| 6,362,776 B1 | * | 3/2002 | Hager et al. | 342/121 |
| 6,462,703 B2 | * | 10/2002 | Hedrick | 342/120 |
| 6,507,289 B1 | * | 1/2003 | Johnson et al. | 340/970 |
| 6,725,153 B2 | * | 4/2004 | Persson | 701/514 |
| 6,792,383 B2 | * | 9/2004 | Brouillard et al. | 702/158 |
| 7,095,364 B1 | * | 8/2006 | Rawdon et al. | 342/120 |
| 2004/0227658 A1 | * | 11/2004 | VandenBerg | 342/25 R |
| 2009/0289834 A1 | * | 11/2009 | Devensky | 342/122 |

\* cited by examiner

*Primary Examiner* — Matthew M Barker
(74) *Attorney, Agent, or Firm* — Donna P. Suchy; Daniel M. Barbieri

(57) ABSTRACT

Present novel and non-trivial systems and methods for generating data in a digital radio altimeter system and detecting transient radio altitude ("RA") information are disclosed. Preliminary RA data is generated by a preliminary spectrum analyzer by analyzing spectrum data (e.g., frequency spectrum data) within a first range, where the spectrum data is representative of RA information. Final RA data is generated by a final spectrum analyzer by analyzing the spectrum data within a second range, where the second range is based upon the preliminary RA data and final RA data previously-generated and fed through a feedback data generator. The final RA data may be provided as source data to one or more user units. One user unit may be a transient RA detector which detects transient RA information based upon the preliminary RA data and the final RA data.

10 Claims, 4 Drawing Sheets

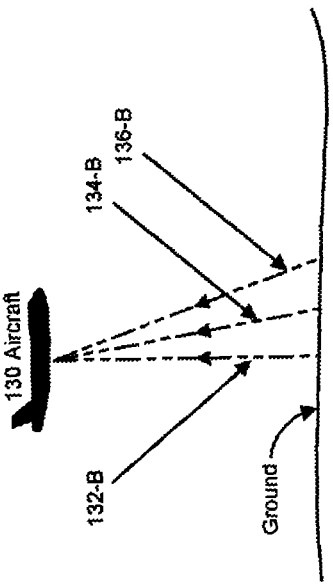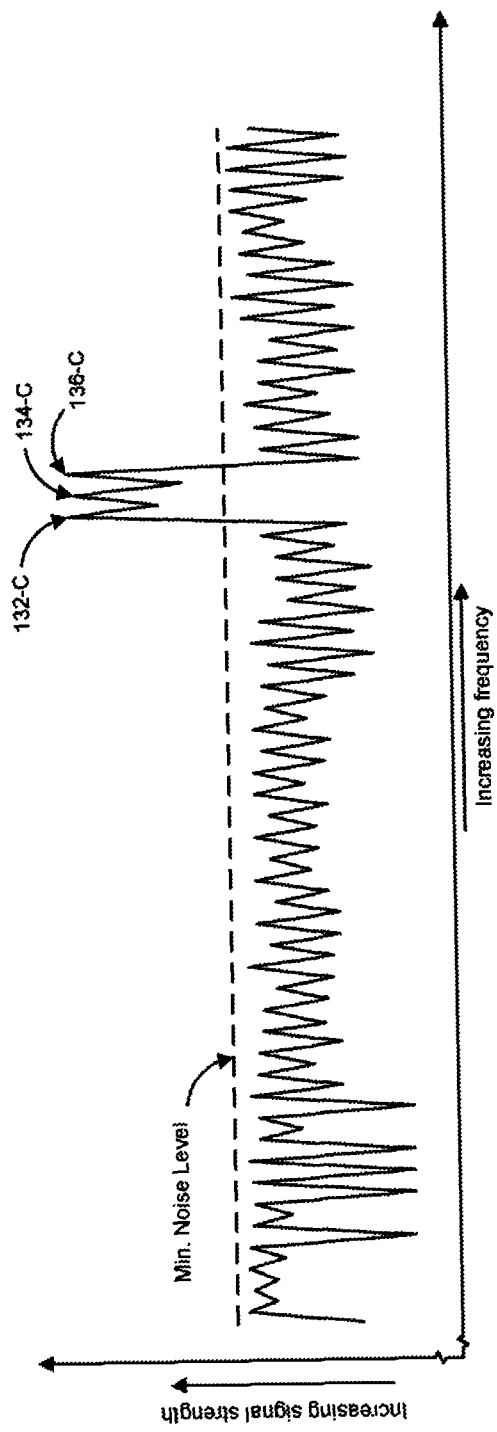

SYSTEMS AND METHODS FOR GENERATING DATA IN A DIGITAL RADIO ALTIMETER AND DETECTING TRANSIENT RADIO ALTITUDE INFORMATION

BACKGROUND OF THE INVENTION

1. Field of the Invention

This invention pertains generally to the field of aircraft radio altimeter systems.

2. Description of the Related Art

Radio altimeter systems often employ transceivers from which a radio frequency ("RF") signal may be transmitted continuously towards the ground in a beam at an assigned frequency and received in a return RF signal comprised of a plurality of reflections having different frequencies. Because a direct relationship exists between frequency and height above the ground, the height of an aircraft above the ground may be determined by analyzing the frequencies of the reflections. This analysis may be accomplished by subjecting the digital counterpart of the returned RF signal to a frequency spectrum analyzer having a relatively wide frequency range bracketed by or defined with low and high bounds. After the analyzer has performed an analysis, data representative of radio altitude ("RA") may be generated and provided as source data to one or more user units. Although the analysis is performed within a wide frequency range, the frequency range due to the plurality of reflections is comparatively narrow during most flight operations.

When one aircraft overflies another aircraft and the overflown aircraft falls within the beam of the transmitted RF signal, the frequency range of the return RF signal may become comparatively wide because the plurality of reflections includes lower-frequency reflections caused by the overflown aircraft. When the digital counterpart of the returned RF signal having the wider frequency range is subjected to the same frequency spectrum analyzer, data representative of a lower RA—but not of the height above the ground—may be generated and provided as source data to one or more user units. Although an encounter with an overflown aircraft may be fleeting in nature, transient RA data not representative of the height above the ground could nevertheless be generated and subsequently provided as source data to one or more user units. If this transient RA data is provided to an indicating system, inconsistent RA information could be presented to the pilot. If it is provided to a terrain and awareness warning system, a false alert could be triggered and presented to the pilot. If it is provided to an automatic flight control system, automatic flight controls could be abruptly and unexpectedly disconnected.

BRIEF SUMMARY OF THE INVENTION

The embodiments disclosed herein present novel and non-trivial systems and methods for generating radio altitude ("RA") data and detecting transient RA information. The employment of such systems and methods in a radio altimeter system may be used to correct for transient RA data and prevent such data from being provided to user systems by the radio altimeter system.

In one embodiment, a system is disclosed for generating RA data. The system could be comprised of a source of spectrum data, a first spectrum analyzer (e.g., a preliminary spectrum analyzer) and a tracking and re-analyzing module, where such module could be further comprised of a second spectrum analyzer (e.g., a final spectrum analyzer), an RA tracking controller, and a feedback data generator. As embodied herein, the source of spectrum data may be comprised of a digital data transformer. The spectrum data may undergo two analyses performed by separate spectrum analyzers. The first spectrum analyzer may analyze the spectrum data using a range defined by configurable low and high bounds to generate first RA data, and the second spectrum analyzer may analyze the spectrum data using a narrower range defined by determinable low and high bounds to generate second RA data. The RA tracking controller may determine the narrower range based upon the first RA data and third RA data generated by the feedback data generator. The feedback data generator may determine the third RA data based upon previously-generated second RA data. As embodied herein, the second RA data may be used as source data for one or more user units such as, but not limited to, an indicating system, a terrain and awareness system, an automatic flight control system, and a transient RA detector.

In another embodiment, a system is disclosed for detecting transient RA information. The system could be comprised of a source of first RA data, a source of second RA data, and a transient RA detector, where the detecting of transient RA information by such detector is based upon first RA data and second RA data provided by their respective sources. As embodied herein, the source of the RA data is a first spectrum analyzer and/or the source of second RA data is a second spectrum analyzer. In one embodiment, subsequent use of the first RA data may be prevented if transient RA information is detected. In another embodiment, the subsequent use of the second RA data may be enabled if transient RA information is detected.

In another embodiment, a method is disclosed for generating RA data. Spectrum data and first RA data may be received, where the spectrum data may have been generated by a first spectrum analyzer analyzing the spectrum data falling between a configurable range. Second RA data may be generated as source data for subsequent use of one or more using units by analyzing the spectrum data falling within a second range, where the second range could be based upon the first RA data and third RA data, and the third RA data may be based upon previously-generated second RA data. As embodied herein, the spectrum data may be buffered prior to the generation of the second RA data, where such buffering may enable the ability to re-analyze the spectrum data by a second spectrum analyzer after the same spectrum data was analyzed by the first spectrum analyzer.

In another embodiment, a method is disclosed for detecting transient RA information. First RA data and second RA data may be received, and based upon the first RA data and the second RA, transient RA information may be detected, where such detection may provide the basis of preventing the subsequent use of the first RA data and/or enabling subsequent use of the second RA data. As embodied herein, one or more distance constraint tests and/or a statistical analysis may serve as the basis for such detection.

BRIEF DESCRIPTION OF THE DRAWINGS

The drawings of FIG. 1 depict functional block diagrams of a radio altimeter system for generating RA data and detecting transient RA information.

The drawings of FIG. 2 depict a direct relationship between radio frequencies of the signal reflected from the ground.

The drawings of FIG. 3 depict a direct relationship between radio frequencies of the reflected by an overflown aircraft.

Figure 4:
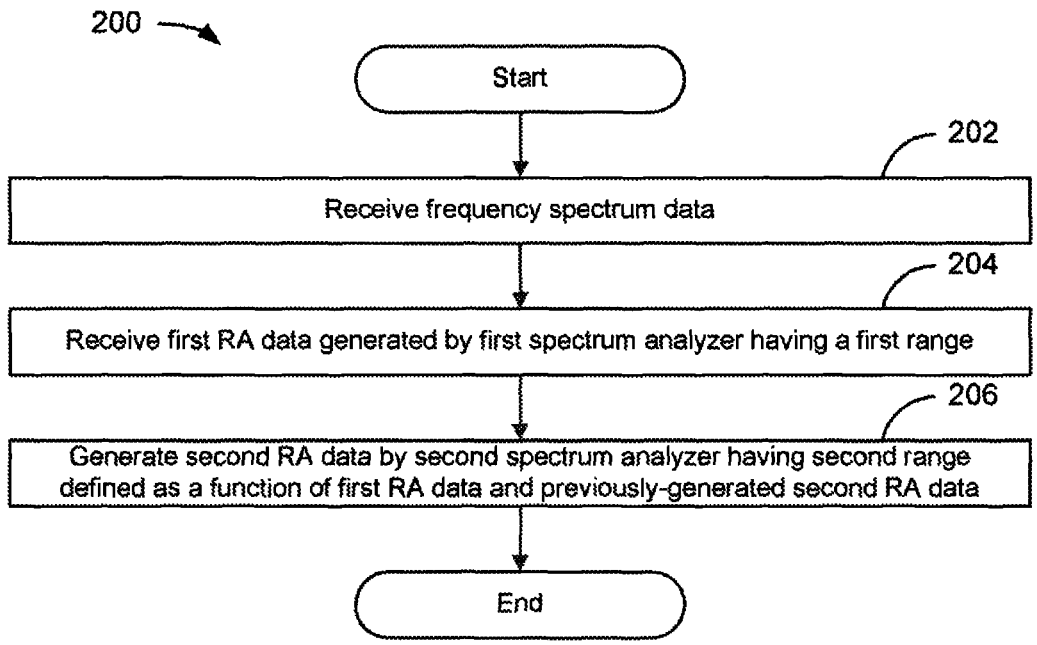

FIG. 4 depicts a flowchart of a method for generating RA data.

Figure 5:
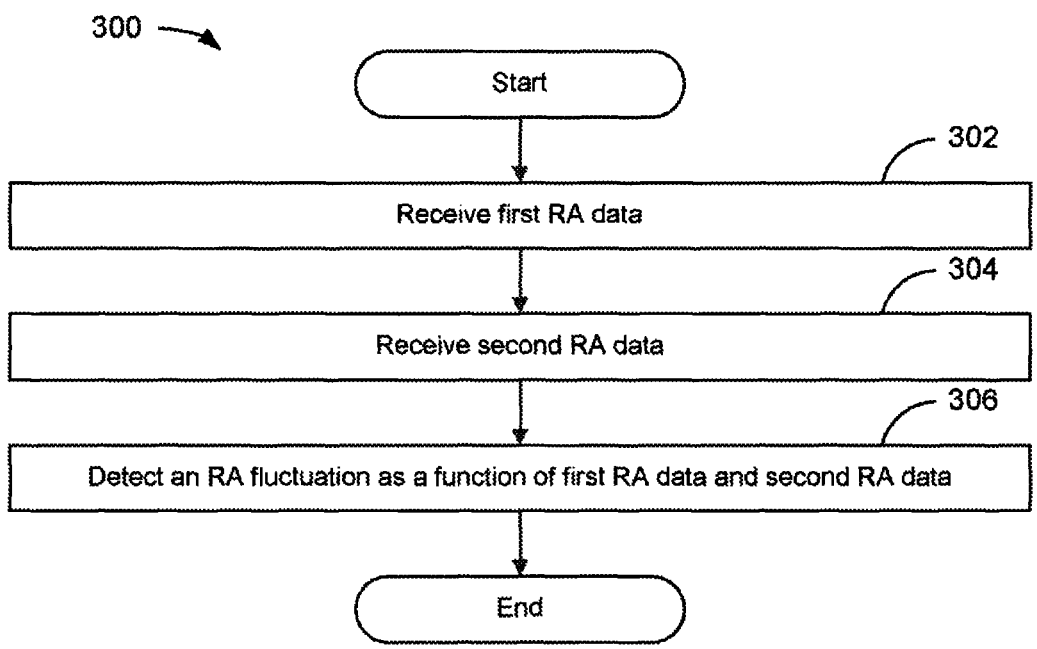

FIG. 5 depicts a flowchart of a method for detecting transient RA information.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1A:
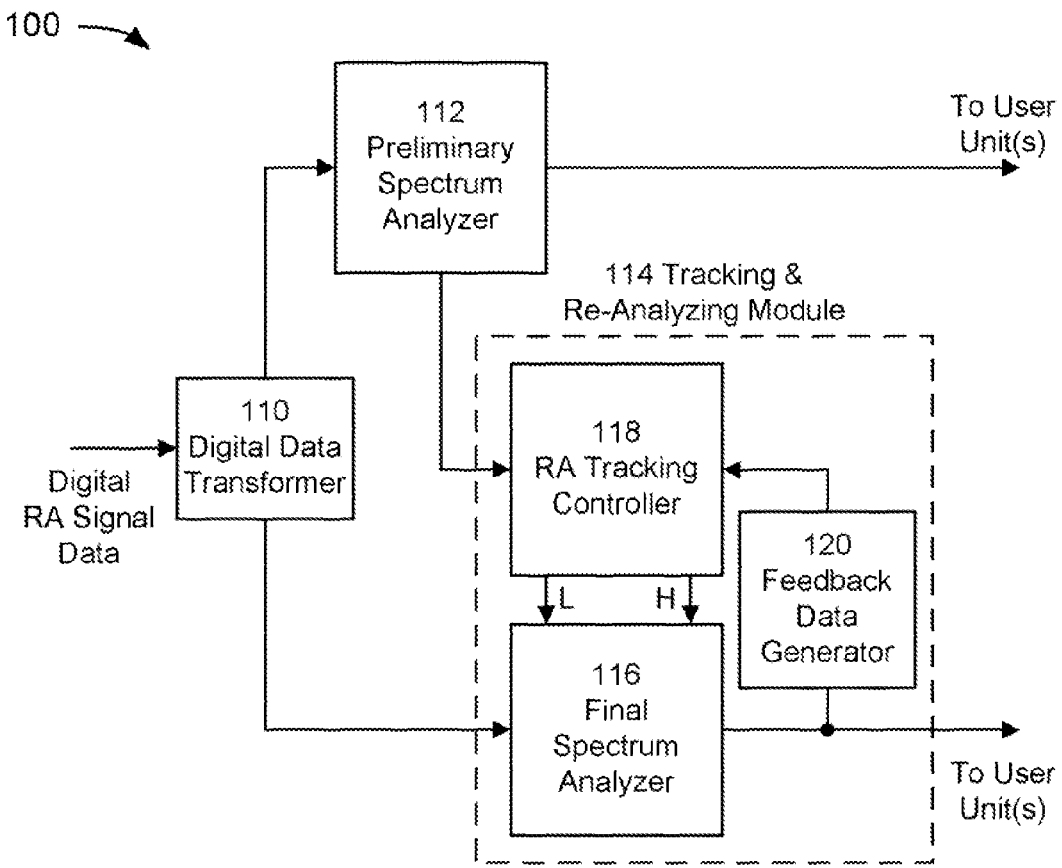
Figure 1B:
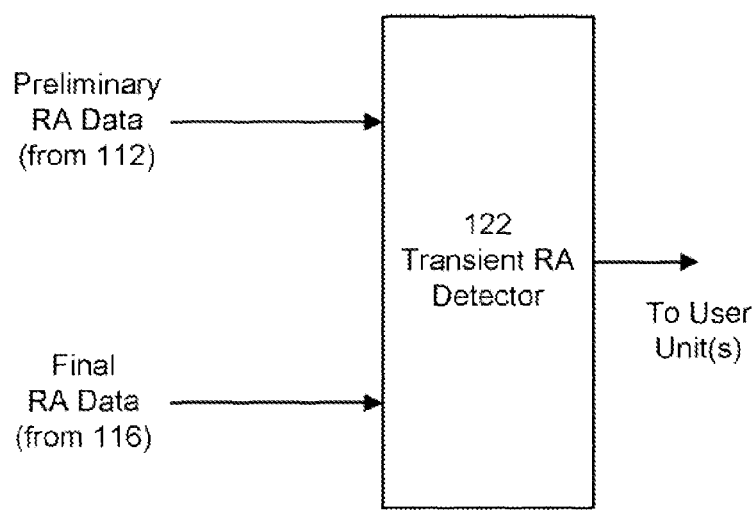

The drawings of FIG. 1 depict functional block diagrams of a radio altimeter system 100 for generating radio altitude ("RA") data and detecting transient RA information suitable for implementation of the techniques described herein. In an embodiment of FIG. 1A, the radio altimeter system 100 for generating RA data could comprise the following blocks: a digital data transformer 110 receiving digital RA data, a preliminary spectrum analyzer ("PSA") 112, and a tracking & re-analyzing module 114, where the tracking & re-analyzing module 114 could be comprised of a final spectrum analyzer ("FSA") 116, an RA tracking controller 118, and a feedback data generator 120. In an embodiment of FIG. 1B, a system for detecting transient RA data could be comprised of a transient RA detector 122 receiving preliminary RA data and final RA data from the PSA 112 and FSA 116, respectively.

The functional blocks of the radio altimeter system 100 could be implemented using any processor or electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory including flash memory, PCMCIA or PC Card, secure digital cards, and compact flash cards. A processor may be driven by the execution of software or source code containing algorithms developed for the specific functions embodied herein. It should be noted that, as embodied herein, the terms "programmed" and "configured" are synonymous. Common examples of electronic data processing units are microprocessors, Digital Signal Processors (DSPs), Programmable Logic Devices (PLDs), Programmable Gate Arrays (PGAs) (e.g., a Field PGA), and signal generators; however, for the embodiments herein, the term "processor" is not limited to such processing units and its meaning is not intended to be construed narrowly. For instance, a processor could also consist of more than one electronic data processing units. As embodied herein, a processor could be a processor(s) used by or in conjunction with any system installed in an aircraft besides the radio altimeter system 100.

The drawings of FIGS. 2 and 3 are presented to illustrate a direct relationship between radio frequencies of the reflected signal and aircraft height above the ground. As illustrated in FIG. 2A, a radio altimeter system installed in aircraft 130 is transmitting a radio frequency ("RF") signal at a frequency set by a manufacturer, and locations 132-A, 134-A, and 136-A are locations within the beam of the signal. As illustrated in FIG. 2B, aircraft 130 is receiving the return RF signal of the transmitted RF signal comprised of the three reflections 132-B, 134-B, and 136-B corresponding to locations 132-A, 134-A, and 136-A. As observed in FIG. 2B, the length of the return path of reflection 132-B is assumed to be slightly shorter than 134-B which, in turn, is assumed to be slightly shorter than 136-B. In FIG. 2C, a graph of a frequency spectrum versus signal strength is shown where the spectrum is assumed to run the length of the dashed line; it should be noted that the graph is exaggerated and not to scale for the purpose of providing an illustration only. As indicated in FIG. 2C, each reflection received by the radio altimeter system has a different frequency. The reflection having the shortest return path (i.e., lower height above the ground) has the lowest frequency 132-C of the three reflections, and the reflection having the longest return path 136-C has the highest frequency. This illustrates the principle known to those skilled in the art that frequency is proportional to height above the ground.

Because the signal of a transmitted beam reflected from relatively flat terrain is typically comprised of a plurality of frequencies having a small range falling within the frequency spectrum, one or more frequency spectrum analysis techniques known to those skilled in the art may be applied over the frequency spectrum to determine the RA. For the purpose of illustration and not of limitation, a weighted average frequency of the plurality of frequencies of the reflections within the frequency spectrum (which meet or exceed a minimum "noise" level) may be determined, where the weighted average frequency has a proportional RA. Then, data representative of RA information may be generated and provided for subsequent use.

Figure 3A:
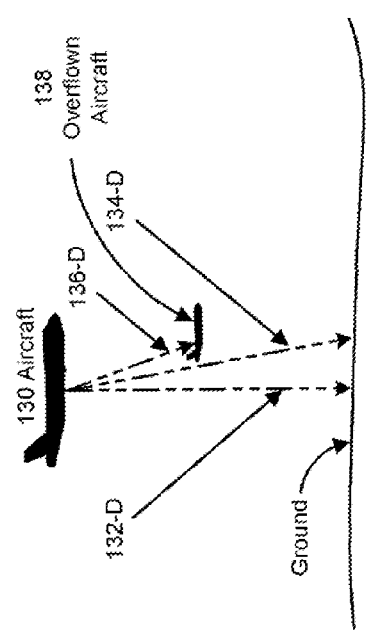
Figure 3B:
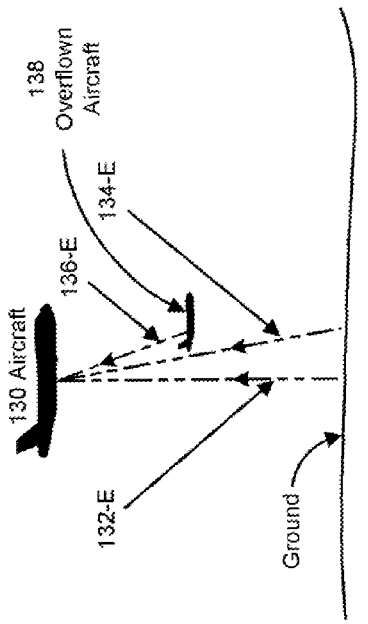

The drawings of FIGS. 3A and 3B are similar to FIGS. 2A and 2B with the exception of the presence of overflown aircraft 138 encountered by aircraft 130. As indicated in FIG. 3B, the length of the return path of reflection 132-E is assumed to be slightly shorter than 134-E; however, the length of return path 136-E is significantly shorter than 134-E due to the overflown aircraft 138. Unlike the graph shown in FIG. 2C, the return signal of a transmitted beam shown in a graph of the frequency spectrum of FIG. 3C is not comprised of a plurality of frequencies having a small range (between the frequencies 132-C and 136-C); instead, the return signal of a transmitted beam is comprised of a plurality of frequencies having a relatively large range (between the frequencies 136-F and 134-F) falling within the frequency spectrum.

The application of one or more frequency spectrum analysis techniques over the frequency spectrum could generate a significantly lower frequency. Moreover, because RA is proportional to frequency, a significantly lower RA could be determined. As a result, the lower RA would not represent the height above ground when the overflown aircraft 138 (or some other object such as a tall building) is present. Although an encounter with the overflown aircraft 138 may be fleeting in nature, transient RA data could be generated that is not representative of the height above the terrain. If a subsequent use of this transient RA data includes an indicating system, inconsistent RA information could be presented to the pilot. If a subsequent use includes a terrain and awareness warning system ("TAWS"), a false alert could be triggered and presented to the pilot. If a subsequent use includes an automatic flight control system ("AFCS"), automatic flight controls could be abruptly and unexpectedly disconnected.

Figure 3C:
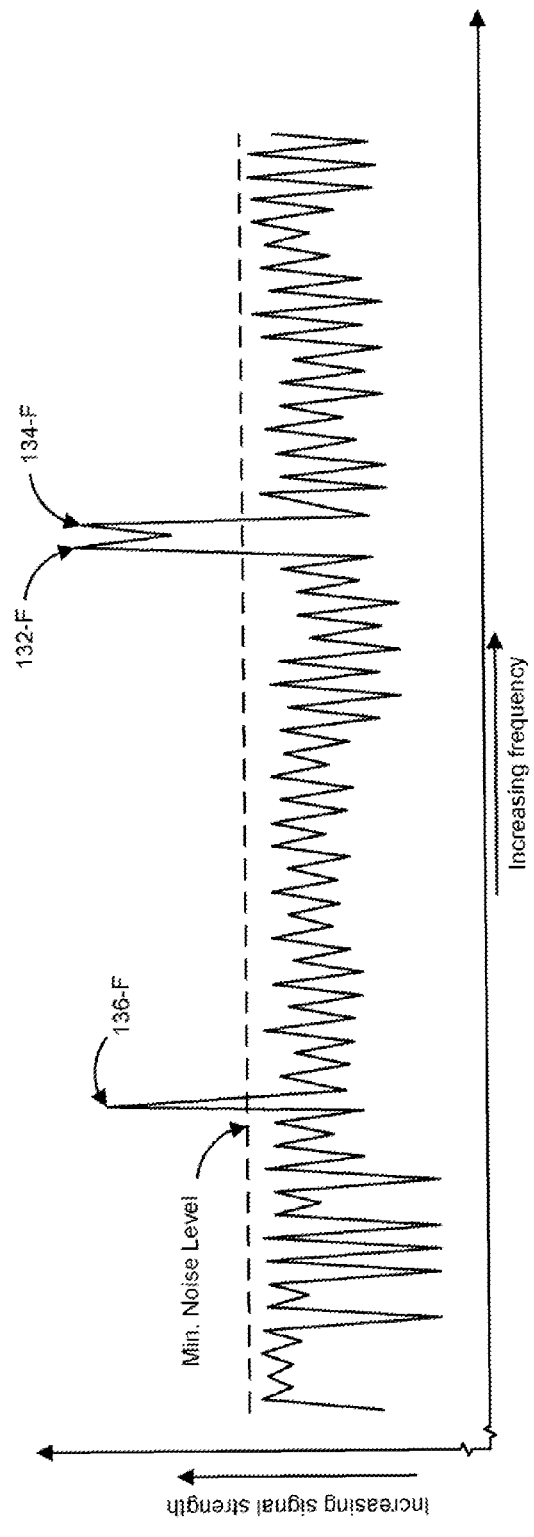

As indicated in FIGS. 2C and 3C, the reflected signal is shown in the frequency domain. Although a spectrum analysis has been conducted in the frequency domain, conversion and transformation techniques may have to be employed in order to place the data into the frequency domain. Initially, a radio altimeter system may transmit and receive an analog RF signal comprised of a plurality of frequencies. When received, the RF signal may initially undergo signal conditioning prior to being subjected to an analog-to-digital conversion using techniques known to those skilled in the art. After conversion of the analog signal into its digital counterpart, the digital data may be referenced to the time domain. To transform the time-domain data to its counterpart in the frequency domain, other techniques for the transforming of data into the frequency domain may be applied by a processor. It should be noted that any technique which results in the transforming of data into the frequency domain is embodied. For the purpose of illustration and not limitation, a non-exhaustive list of such techniques could include a Fourier Transformation and/or a Discrete Fourier Transformation employing a Fast Fourier Transform algorithm.

Returning to FIG. 1A, the digital data provided as input to the digital data transformer 110 could be time-domain data representative of RA signal information. If so, the digital data transformer 110 could transform such data into frequency spectrum data having a given range. Although not indicated in FIG. 1, a manufacturer may choose to convert the unit of the spectrum data from frequency to an equivalent corresponding unit on which a subsequent analysis may be performed by the PSA 112 and/or FSA 116. For example, frequency data could be converted into distance data (e.g., feet or meters) prior to being provided to the PSA 112 and/or FSA 116. Although the remaining discussion will be drawn to frequency spectrum data, the embodiments herein are not limited to data measured in frequencies but could include data measured in other units.

Frequency spectrum data could be provided to the PSA 112. As embodied herein, the low and high bounds of the PSA 112 could be configurable by a manufacturer. The low and high bounds could be configured to be the same bounds that define the given range of the frequency spectrum data, or the low and high bounds could be configured to be different. Once the frequency spectrum data has been provided to the frequency spectrum analyzer 112, preliminary RA data representative of preliminary RA information may be generated by analyzing the frequency spectrum data within the range of the low and high bounds using technique(s) known to those skilled in the art. In one embodiment, the preliminary RA data may be provided to the RA tracking controller 118 of the tracking & re-analyzing module 114. In another embodiment, the preliminary RA data may be provided to a transient RA detector 122.

In addition to the PSA 112, frequency spectrum data could be provided to the FSA 116 of the tracking & re-analyzing module 114; however, the analysis by the FSA 116 may not be performed simultaneously. Instead, the frequency spectrum data may be buffered to delay the analysis by the FSA 116 until low and high bounds have been determined by the RA tracking controller 118 using, in part, the preliminary RA data of the same frequency spectrum data generated by the PSA 112. Then, once the low and high bounds have been determined and provided to the FSA 116, the same frequency spectrum data may be freed from the buffer and undergo an analysis by the FSA 116 to generate final RA data representative of final RA information.

The feedback data generator 120 may be configured to employ a plurality of final RA data generations to track RA by generating feedback RA data representative of at least one reference value from which low and high bounds may be determined and controlled. For example, the feedback data generator 120 could employ a first in, first out buffer comprised of a plurality of elements for storing the most recent generations of final RA data. For each cycle in which final RA data is generated, the newly-generated final RA data replaces the oldest-generated final RA data stored in the buffer. Using the final RA data stored in the buffer, the feedback data generator 120 may employ any suitable technique for determining the reference(s) that may be utilized by the RA tracking controller 118. For the purpose of illustration and not of limitation, the feedback generator 120 may employ a statistical analysis for the determination of the reference(s). For example, an average value, a minimum value, and/or a maximum value of the buffered final RA data may be determined, and the data representative of these values may be fed to the RA tracking controller 118.

After receiving data representative of reference values from the feedback data generator 120 and data representative of preliminary RA information from the PSA 112, the RA tracking controller 118 may employ an algorithm to determine the low and high bounds of the FSA 116, where such bounds could define a narrower range than the range defined by the bounds of the PSA 112. By narrowing the range, transient RA data produced by an encounter with the overflown aircraft could fall outside of the narrowed range and excluded from the analysis of the FSA 116. Although the transient RA data was included in the generation of preliminary RA data by the PSA 112 because of a wider range, the transient RA data could be excluded in the generation of final RA data by the FSA 116 because of the narrower range. In this manner, the final RA data representative of final RA information may be generated and provided for subsequent use instead of and/or along with the preliminary RA data.

As embodied herein, the algorithm employed by the RA tracking controller 118 may be comprised of any suitable technique configurable by a manufacturer for determining the low and high bounds that would narrow the range of the FSA 116 as compared with the range of the PSA 112. For the purpose of illustration and not of limitation, the following examples are provided to show how the low and high bounds can be determined as a function of the preliminary RA data and data representative of one or more reference values of the buffered final RA data.

In one example, a manufacturer may define the low and high bounds using one-half the difference between the preliminary RA data and reference RA data to find a bounds adjustment factor, where the reference RA data comprises the average data of the buffered final RA data of the feedback data generator 120. The bounds adjustment factor may be subtracted from the average RA value and added to the average RA value to determine the low and high bounds, respectively. Assume the preliminary RA equals 3,000 feet and the average RA equals 3,500 feet. Then, the resulting bounds adjustment factor would equal 250 feet, the low bound would equal 3,250 feet, and the high bound would equal 3,750 feet. After the low and high bounds have been determined, data representative of such bounds may be provided to the FSA 116 for an analysis of the same frequency spectrum data upon which the preliminary RA data of 3,000 feet was based to generate final RA data. As a result, any frequency spectrum data falling outside of the range between 3,250 feet and 3,750 feet would be excluded from the analysis although included in the analysis of the PSA 112.

In another example, the reference data could be comprised of the average value, the minimum value, and/or the maximum value of the buffered final RA data. In this case, the bounds adjustment factor may be subtracted from the minimum RA value and added to the maximum RA value to determine the low and high bounds, respectively. Assume the preliminary RA is 3,000 feet, the average RA is 3,500 feet, the minimum RA value is 3,300 feet, and the maximum RA is 3,600 feet. Then, the resulting bounds adjustment factor would equal 250 feet, the low bound would equal 3,050 feet, and the high bound would equal 3,850. After the low and high bounds have been determined, data representative of such bounds may be provided to the FSA 116 for an analysis to generate final RA data. As a result, any frequency spectrum data falling outside of the range between 3,050 feet and 3,850 feet would be excluded from the analysis although included in the analysis of the PSA 112.

In another example, the low and high bounds do not need to be determined every cycle on which preliminary RA data is provided. Instead, the determination could be conditioned on whether the difference between the preliminary RA and the reference RA exceeds a threshold based upon the reference RA data. For instance, a threshold could be defined as a function of a percentage of the average RA value. Assume the preliminary RA equals 3,000 feet, the average RA equals 3,500 feet, and the threshold is defined as 5 percent. Then, the threshold would equal 175 feet. Since the difference between the preliminary RA and the reference RA equals 500 feet, the threshold has been exceeded, and the low and high bounds would have to be determined. On the other hand, assume that the preliminary RA equals 3,350 feet and the average RA equals 3,500 feet. Since the difference equals 150 feet, the threshold of 175 feet has not been exceeded, and the low and high bounds would not have to be determined. In such a case, the previously-determined bounds may be re-used by the FSA 116.

After the PSA 112 and/or FSA 116 have conducted an analysis on the same frequency spectrum data, the preliminary RA data and/or final RA data generated by its respective analyzer may be provided to one or more user units. In one embodiment, preliminary RA information represented in the preliminary RA data and/or final RA information represented in the final RA data could be provided to the transient RA detector 122 and/or another unit of the radio altimeter system. In another embodiment, such RA information could be provided to a unit of one or more aircraft systems such as, but not limited to, an indicating system, a TAWS, and/or an AFCS.

Referring to FIG. 1B, the transient RA detector 122 could receive the RA data from two sources. Here, the PSA 112 may provide preliminary RA data, and the FSA 116 could provide final RA data. The transient RA detector 122 could subject both sets of data to one or more tests. One test could comprise an examination of one or more distance constraints. Another test could be comprised of a statistical analysis. If one or both tests are passed, then transient RA information may have been detected. If detected, one or more actions could result. In one embodiment, the transient RA detector 122 may prevent the subsequent use of preliminary RA information represented in the preliminary RA data by one or more user units. In another embodiment, the transient RA detector 122 may enable the subsequent use of final RA information represented in the final RA data by one or more user units.

In one test, one or more distance constraints configurable by a manufacturer could be examined to ensure that a minimum value of each constraint has been met before a detection of transient RA information has been made. Referring to the aircraft references shown in the drawings of FIG. 3, one distance constraint could be a height above ground level of overflown aircraft 138 using the difference between RA values represented in the final RA data and the preliminary RA data. A second distance constraint could be a minimum aircraft separation between overflown aircraft 138 and aircraft 130 using the preliminary RA data generated by the PSA 112. A third distance constraint could be the height above ground level of aircraft 130 using the final RA data generated by the FSA 116.

In another test, a statistical analysis could be performed on the preliminary RA data. For example, a variance test could be performed on a plurality of preliminary RA data provided by the PSA 112 during a plurality of cycles, where a buffer comprised of a plurality of elements may be utilized. Buffered data which produces a relatively small variance value could indicate the presence of an overflown aircraft.

FIG. 4 depicts a flowchart 200 of an example of a method for generating RA data in a radio altimeter system for the use of at least one user unit. The flowchart begins with module 202 with the receiving of spectrum data representative of RA. As embodied herein, the spectrum data could comprised of frequency spectrum data. The FSA 116 of the tracking & re-analyzing module 114 could receive the spectrum data provided by the digital data transformer 110. In an additional embodiment, the spectrum data could be stored in a buffer to delay the analysis of the FSA 116. As embodied herein, the processor could comprise the digital data transformer.

The flowchart continues with module 204 with the receiving of first RA data generated by a first spectrum analyzer. As embodied herein, the RA tracking controller 118 of the tracking & re-analyzing module 114 could receive the preliminary RA data from the PSA 112. The first spectrum analyzer could have generated the first RA data by analyzing the spectrum data. The analysis of the first spectrum analyzer could be performed on the spectrum data falling within a first range, where the first range may be configured by a manufacturer. In addition, such range could correspond to the maximum RA range in which the radio altimeter operates.

The flowchart continues with module 206 with the generating of second RA data by a second spectrum analyzer analyzing the spectrum data. As embodied herein, the second spectrum analyzer could be the FSA 116 analyzing the spectrum data and generating final RA data. The analysis of the second spectrum analyzer could be performed on the spectrum data falling within a second range, where the second range comprised be of low and high bounds defined as a function of the preliminary RA data and third altitude data by the RA tracking controller 118 as discussed above, where the third altitude data can be provided as reference data by the feedback data generator 120 and defined as a function of previously-generated final RA data which may be stored in a buffer. As embodied herein, the reference data could include, but are not limited to, data representative of an average value, a minimum value and/or a maximum value of the previously-generated final RA data. In an additional embodiment, spectrum data that was previously buffered could be released from the buffer once the second range has been determined from the same spectrum data.

After the second spectrum analyzer has generated the second RA data, RA information represented in the second RA data could be employed by one or more user units. In one embodiment, the user unit(s) could be comprised of one or more aircraft systems such as, but not limited to, an indicating system, a TAWS, and/or an AFCS. In another embodiment, the user unit(s) could be comprised of the transient RA detector 122 and/or another unit of the radio altimeter system. Then, the flowchart proceeds to the end.

FIG. 5 depicts a flowchart 300 of an example of a method for detecting transient RA information in a radio altimeter system. The flowchart begins with module 302 with the receiving of first RA data. As embodied herein, the transient RA detector 122 could receive the preliminary RA data from the PSA 112. As embodied herein, the processor could be comprised of the PSA 112.

The flowchart continues with module 304 with the receiving of second RA data. As embodied herein, the transient RA detector 122 could receive the final RA data from the FSA 116. As embodied herein, the processor could be comprised of the FSA 116.

The flowchart continues with module 306 with the detecting of transient RA information as a function of the first RA data and the second RA data. In one embodiment, the preliminary RA data and the final RA data could be subjected to at least one constraint test which, if passed, could indicate the detection of transient RA information. As discussed above, one distance constraint could be a value for height above ground level of overflown aircraft 138 using the difference between RA values represented in the final RA data and the preliminary RA data. In another embodiment, the preliminary RA data could be subjected to a statistical analysis.

When transient RA information is detected, the transient RA detector 122 in one embodiment may prevent the subsequent use of RA information represented in the first RA data by one or more user units; in another embodiment, the transient RA detector 122 may enable the subsequent use of RA information represented in the second RA data by one or more user units. Then, the flowchart proceeds to the end.

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for detecting transient radio altitude information in a radio altimeter system, such system comprising:
    a source of first radio altitude data;
    a source of second radio altitude data;
    a source of third radio altitude data; and
    a processor comprised of
        a transient radio altitude detector configured to
            receive first radio altitude data,
            receive second radio altitude data, where
                the first radio altitude data and the second radio altitude data are derived from third radio altitude data, and
            detect transient radio altitude information as a function of the first radio altitude data and the second radio altitude data, where
                the transient radio altitude is a measurement other than a measurement of height above the surface.

2. The system of claim 1, wherein
    the source of first radio altitude data is a first spectrum analyzer,
    the source of second radio altitude data is a second spectrum analyzer, or both.

3. The system of claim 2, wherein
    the processor is further comprised of
        the first spectrum analyzer,
        the second spectrum analyzer, or
        both.

4. The system of claim 1, wherein the function is comprised of
    at least one distance constraint test,
    a statistical analysis, or
    at least one distance constraint test and a statistical analysis.

5. The system of claim 1, wherein
    the processor is configured to
        prevent the subsequent use of radio altitude information represented in the first radio altitude data when transient radio altitude information is being detected.

6. The system of claim 1, wherein
    the processor is configured to
        enable the subsequent use of radio altitude information represented in the second radio altitude data when transient radio altitude information is being detected.

7. A method for detecting transient radio altitude information in a radio altimeter system, such method comprising:
    receiving first radio altitude data generated by a first spectrum analyzer;
    receiving second radio altitude data generated by a second spectrum analyzer, where the first radio altitude data and the second radio altitude data are derived from third radio altitude data; and
    detecting transient radio altitude information as a function of the first radio altitude data and second radio altitude data, where
        the transient radio altitude is a measurement other than a measurement of height above the surface.

8. The method of claim 7, wherein
    the function is comprised of
        at least one distance constraint test,
        a statistical analysis, or
        at least one distance constraint test and a statistical analysis.

9. The method of claim 7, further comprising:
    preventing the subsequent use of radio altitude information represented in the first radio altitude data when transient radio altitude information is being detected.

10. The method of claim 7, further comprising:
    enabling the subsequent use of radio altitude information represented in the second radio altitude data when transient radio altitude information is being detected.

* * * * *